United States Patent [19]
Texier et al.

[11] 3,987,251
[45] Oct. 19, 1976

[54] TIME DIVISION SWITCHING NETWORK FOR SWITCHING MULTIRATE MULTIPLEXED DATA

[76] Inventors: Alain Texier, 32, Avenue du General De Gaulle, Meudon La Foret, France, 92360; Edgar L. Lapeyronnie, 139 Boulevard Maxime Gorki, Villejuif, France, 94800

[22] Filed: Dec. 29, 1975

[21] Appl. No.: 645,237

[30] Foreign Application Priority Data
Dec. 27, 1974  France .............. 74.43116

[52] U.S. Cl. .............. 179/15 BV; 179/15 AT
[51] Int. Cl.² .............. H04Q 11/04
[58] Field of Search ......... 179/15 BV, 15 BA, 15 A, 179/15 AT, 15 AQ; 178/50

[56] References Cited
UNITED STATES PATENTS

| | | | |
|---|---|---|---|
| 3,535,450 | 10/1970 | Vollmeyer .............. | 178/50 |
| 3,794,768 | 2/1974 | Carney .............. | 179/15 BV |
| 3,890,469 | 6/1975 | Kelly .............. | 179/15 AQ |
| 3,894,189 | 7/1975 | Edstrom .............. | 179/15 AQ |
| 3,922,494 | 11/1975 | Cooper .............. | 179/15 A |
| 3,952,162 | 4/1976 | Texier .............. | 179/15 BV |

*Primary Examiner*—David L. Stewart
*Attorney, Agent, or Firm*—Abraham A. Saffitz

[57] ABSTRACT

A time division digital switching network comprises first multiplexing means in which first-order digital data channels transmitting words consisting of a given number of bits and having first rates which are different from, but multiple of, one another undergo a first multiplexing converting them into a second-order digital data channel having a second predetermined rate. Each given second-order channel comprises a combination of first-order channels having different rates $r_1$. In each combination, there are $x_i$ words at the rate $x_i$ and the quantity $\Sigma r_i x_i$ defines a multiframe. Thereafter there are provided second multiplexing means in which the second-order digital channels undergo a second multiplexing converting them into a third-order digital data channel having a third predetermined rate. In a digital switching unit having at least one buffer store, the first-order channel words multiplexed into the third-order channel are grouped at an address whose first part depends upon the second-order channel they occupy in the third-order channel and whose second part is derived from the word number in the multiframe. The word number in the multiframe corresponds to a given first-order channel according to the schedule of multiplexing. The bits of a given rank of the words of a second-order channel form a pseudorandom sequence having a known period and, therefore, the bits of a given rank of the words of a third-order channel form a number of interleaved pseudorandom sequences. The digital switching unit includes means for separating these interleaved pseudorandom sequences and for deducting from the bits composing them the second part of the address of the words and from the latter the addresses of the first-order channels.

4 Claims, 4 Drawing Figures

TIME DIVISION SWITCHING NETWORK FOR SWITCHING MULTIRATE MULTIPLEXED DATA

BACKGROUND OF THE INVENTION

This invention relates to a time-division digital switching network for switching time-multiplexed data arising from the time multiplexing of component data at different rates -i.e., multiplexed at different recurrence periods or rates.

A switching network of the kind described will hereinafter be called a multirate multiplex switching network.

DESCRIPTION OF THE PRIOR ART

U.S. Patent Application Ser. No. 581,081 filed May 27, 1975 and now U.S. Pat. No. 3,952,162, issued April 20, 1976, describes a monorate multiplex digital switching network for switching data octets at different user rates of e.g. 9.6, 2.4 and 0.6 kbit/s. Since the octets consist of 1 framing sequence bit, 6 information bits and 1 status bit, there correspond to these binary user rates transmission-channel binary rates which are one-third higher - i.e., 12.8, 3.2 and 0.8 kbit/s, respectively.

A 64 kbit/s channel can be formed by multiplexing five 12.8 kbit/s channels or 20 3.2 kbit/s channels or 80 0.8 kbit/s channels, the 12.8 kbit/s channel repeating every fifth octet (5-octet frame), the 3.2 kbit/s channel repeating every 20th octet (20-octet frame) and the 800 bit/s channel repeating every 80th octet (80-octet frame). The lowest common multiple of the octet numbers of the various frames is 80 and this is the number taken to define the multiframe. The 80 octets forming a multiframe are detected by their first bits which form a pseudorandom multiframing sequence.

In the patent application above-mentioned, the octets of the first-order digital channels at the 12.8, 3.2 and 0.8 kbit/s rates are given a first time-multiplexing converting them into 64 kbit/s second-order digital channels, which are given a second time-multiplexing converting them into 2.048 Mbit/s third order digital channels. The second-order channels are homogeneous or of the monorate kind - i.e., they arise from the multiplexing of a number of first-order channels having the same rate which can be 5 octets per frame or 20 octets per frame or 80 octets per frame.

SUMMARY OF THE PRESENT INVENTION

According to the present invention, however, the second-order channels are multirate channels because they simultaneously contain octets at a rate of one octet every five octets, one octet every 20 octets and one octet every 80 octets.

If $x$ denotes the number of 12.8 kbit/s rate channels, $y$ the number of 3.2 kbit/s rate channels and $z$ the number of 0.8 kbit/s rate channels, the total number of channels is $(x+y+z)$ and if, as assumed, the multiframe contains 80 octets, the multiplexing combinations for the channels are positive and integral solutions for $x$, $y$, $z$ of the equation:

$$16x + 4y + z = 80$$

since there are 16 octets at the 5-octet recurrence and 4 octets at the 20-octet recurrence and 80 octets at the 1-octet recurrence in a multiframe.

Referring in anticipation to the graph of FIG. 2, the total channel number $(x+y+z)$ is plotted on the abscissa and the possible number N of different multiplexing combinations is indicated along the ordinate. For instance, if $(x+y+z) = 20$, there are $N = 5$ possible multiplexing combinations:

TABLE I

| x | y | z |
|---|---|---|
| 0 | 20 | 0 |
| 1 | 15 | 4 |
| 2 | 10 | 8 |
| 3 | 5 | 12 |
| 4 | 0 | 16 |

If, for instance, $x = 2$, $y = 10$ and $z = 8$, the multiframe octets are given by the following table II where the number denotes the rank of the octet in the multiframe, the first subscript 1 or 2 or 3 denotes the rate of the corresponding signal (1 = high rate; 2 = intermediate rate and 3 = low rate), the second subscript denotes the channel number, the high-rate channels being numbered from 1 to 2, the intermediate rate channels from 1 to 10 and the low-rate channels from 1 to 8, and the third subscript denotes the number of the channel in a single sequence from 1 to 10:

TABLE II

| | | | | | | | | | |
|---|---|---|---|---|---|---|---|---|---|
| $0_{1,1,1}$ | $1_{1,2,2}$ | $2_{2,1,3}$ | $3_{2,2,4}$ | $4_{2,3,5}$ | $5_{1,1,1}$ | $6_{1,2,2}$ | $7_{2,4,6}$ | $8_{2,5,7}$ | $9_{2,6,8}$ |
| $10_{1,1,1}$ | $11_{1,2,2}$ | $12_{2,7,9}$ | $13_{2,8,10}$ | $14_{2,9,11}$ | $15_{1,1,1}$ | $16_{1,2,2}$ | $17_{2,10,12}$ | $18_{3,1,13}$ | $19_{3,2,14}$ |
| $20_{1,1,1}$ | $21_{1,2,2}$ | $22_{2,1,3}$ | $23_{2,2,4}$ | $24_{2,3,5}$ | $25_{1,1,1}$ | $26_{1,2,2}$ | $27_{2,4,6}$ | $28_{2,5,7}$ | $29_{2,6,8}$ |
| $30_{1,1,1}$ | $31_{1,2,2}$ | $32_{2,7,9}$ | $33_{2,8,10}$ | $34_{2,9,11}$ | $35_{1,1,1}$ | $36_{1,2,2}$ | $37_{2,10,12}$ | $38_{3,3,15}$ | $39_{3,4,16}$ |
| $40_{1,1,1}$ | $41_{1,2,2}$ | $42_{2,1,3}$ | $43_{2,2,4}$ | $44_{2,3,5}$ | $45_{1,1,1}$ | $46_{1,2,2}$ | $47_{2,4,6}$ | $48_{2,5,7}$ | $49_{2,6,8}$ |
| $50_{1,1,1}$ | $51_{1,2,2}$ | $52_{2,7,9}$ | $53_{2,8,10}$ | $54_{2,9,11}$ | $55_{1,1,1}$ | $56_{1,2,2}$ | $57_{2,10,12}$ | $58_{3,5,17}$ | $59_{3,5,18}$ |
| $60_{1,1,1}$ | $61_{1,2,2}$ | $62_{2,1,3}$ | $63_{2,2,4}$ | $64_{2,3,5}$ | $65_{1,1,1}$ | $66_{1,2,2}$ | $67_{2,4,6}$ | $68_{2,5,7}$ | $69_{2,6,8}$ |
| $70_{1,1,1}$ | $71_{1,2,2}$ | $72_{2,7,9}$ | $73_{2,8,10}$ | $74_{2,9,11}$ | $75_{1,1,1}$ | $76_{1,2,2}$ | $77_{2,10,12}$ | $78_{3,7,19}$ | $79_{3,8,20}$ |

In digital switching networks, the octets of the incoming third order channel must be written into a buffer store at an address depending on the address they have in the first-order component channels multiplexed in said incoming multiplex channel. In monorate multiplex digital switching networks, the address of each octet in the third-order channel can be readily determined and, as described in the patent application previously mentioned and as will be recalled hereinafter, the first-order channel address is correlated with the address of the octet in the third-order channel and is deduced from the latter address just by division.

In multirate multiplex digital switching networks, there is no simple relationship between the first-order channel address and the address of the octet in the incoming multiplex of the third order. The channel address is associated with the octet address via the multiplexing schedule.

According to the invention, the time division digital switching network comprises: first multiplexing means in which first-order data digital channels transmitting words consisting of a given bit number, the channels having first rates which are different from, but multiples of, one another, are given a first multiplexing converting them into second-order data digital channels at a second predetermined rate; second multiplexing means in which the second-order digital channels are given a second multiplexing converting them into third-order data digital channels at a third predetermined rate; and a digital switch having at least one buffer store in which the first-order channel words multiplexed in the third-order channels are collected at an address depending upon the second-order channel occupied by the last-mentioned words in the third-order channel and upon the first-order channel occupied by the last-mentioned words in the second-order channel. The bits of a given rank in the words of a second-order channel form a pseudorandom sequence of known period, and so the bits of a given rank on the words of a third-order channel form a number of interlaced pseudorandom sequences. The digital switch has means for separating the interlaced pseudorandom sequences and for deducing from the bits composing them the second part of the address of the words, and it is characterized in that it comprises a read only store addressed by the full addresses (first part and second part) of the words and containing the addresses of the first-order channels which correspond, in accordance with the second-order channel multiplexing schedule, to the addresses of the words. The read only store serves for the write-in and read-out addressing of the buffer of the digital switch.

BRIEF DESCRIPTION OF THE DRAWINGS

The invention will now be described in detail with reference to the accompanying drawings wherein.

Hereinafter, the data words are octets and the bits of given rank forming the pseudorandom sequences are the first bits of the octets.

DESCRIPTION OF THE PREFERRED EMBODIMENTS

Figure 1A:
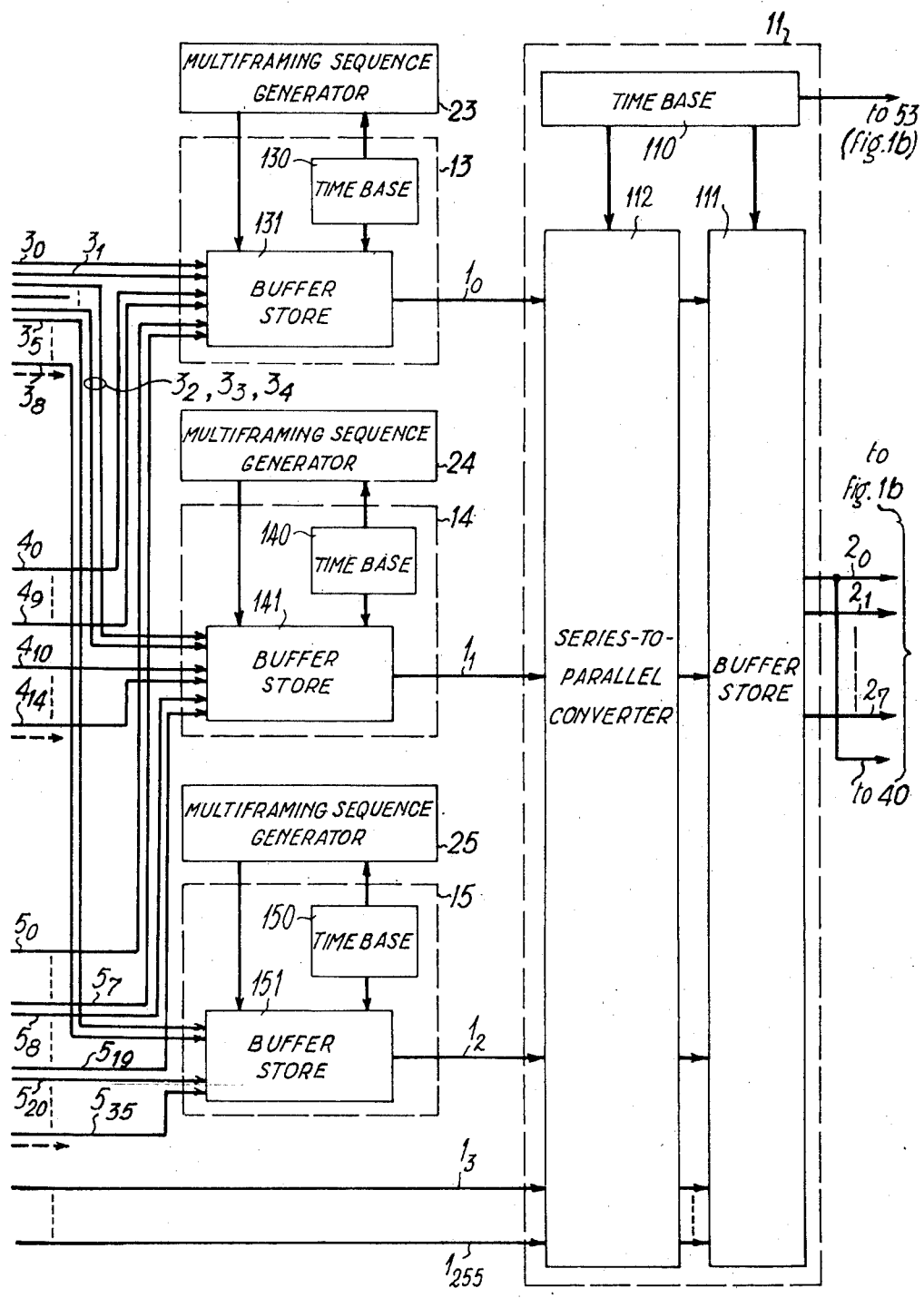
FIG. 1a, 1b and 1c are views, in the form of block diagrams, of the time division digital switching network and the input multiplexers and the output demultiplexers.

Referring now to FIG. 1a, incoming time-division second-order multiplex channels $1_0$ to $1_{255}$ at an user rate of 64 kbit/s and in which the octets are serially conveyed are multiplexed into 8 parallel multiplex junctions $2_0$ to $2_7$ each at the rate of 2.048 Mbit/s - i.e., where the time slots allotted to the incoming multiplex channels are $125/256 \approx 0.5$ $\mu$s. The 8 multiplex junctions $2_0$ to $2_7$ transmit the bits of the octets in parallel, one bit on each of the junctions.

The second-order incoming channels $1_0$ to $1_{255}$ are composite channels of known type, each having three individual channels, one transmitting 64 kbit/s data, the second transmitting a 64 kHz clock or timing bit signal, and the third transmitting a 8 kHz clock or timing octet signal. The latter channels which, in the earlier patent application mentioned, arise from monorate multiplexing of first-order channels, either of 5 12.8 kbit per s. channels exclusively or of 20 3.2 kbit per s. channels exclusively or of 80 0.8 kbit per s. channels exclusively arise in the present case from a multirate multiplexing of first-order channels comprising e.g.:

- 2 12.8 kbit per s. channels $3_0$ and $3_1$, 10 3.2 kbit per s. channels $4_0$ to $4_9$ and 8 0.8 kbit per s. channels $5_0$ to $5_7$ as regards the second-order channel $1_0$;
- 3 12.8 kbit per s. channels $3_2$, $3_3$, $3_4$, 5 3.2 kbit per s. channels $4_{10}$ to $4_{14}$ and 12 0.8 kbit per s. channels $5_8$ to $5_{19}$ as regards the second-order channel $1_1$; and
- 4 12.8 kbit per s. channels $3_5$ to $3_8$, no 3.2 kbit per s. channel and 16 0.8 kbit per s. channels $5_{20}$ to $5_{35}$ as regards the second-order channel $1_2$.

The composition of the other second-order channels does not need to be given here.

The multiplexings of the first-order channels into second-order channels are performed in multiplexers 13, 14, 15 respectively as regards second-order channels $1_0$, $1_1$, $1_2$. The multiplexing of the 256 64 kbit/s channels is performed in a multiplexer 11.

Each multiplexer 13, 14, 15 comprises in known manner a respective time base 130, 140, 150 producing timing pulses at the frequency of the incoming data and timing pulses at the frequency of the outgoing data, and a respective buffer store 131, 141, 151.

The octets are written into the respective store 131, 141, 151 under the control of the timing signals at the frequency of the incoming data; during write-in, the first bit — i.e., the framing bit — is eliminated and replaced by a bit F of the multiframing sequence produced by the multiframing sequence generator 23, 24, 25 respectively. Such generators are known in the art. The earlier patent application hereinbefore alluded to described such a generator, of use for producing an 80-bit pseudorandom multiframing sequence and which can be used without alteration as the generator 23 or 24 or 25 of FIG. 1a.

The multiplexer 11 which multiplexes already multiplexed signals comprises in conventional manner a time base 110, a series-to-parallel converter 112 and a buffer store 111. Time base 110 defines incoming-bit time 66 lasting approximately 16 $\mu$s and outgoing time slots of 0.5 $\mu$s. The incoming bits are in series and an octet lasts for a 16×8 $\approx$ 125 $\mu$s time slot. The outgoing octets are in parallel and last for a 0.5 $\mu$s time slot.

Figure 1B:
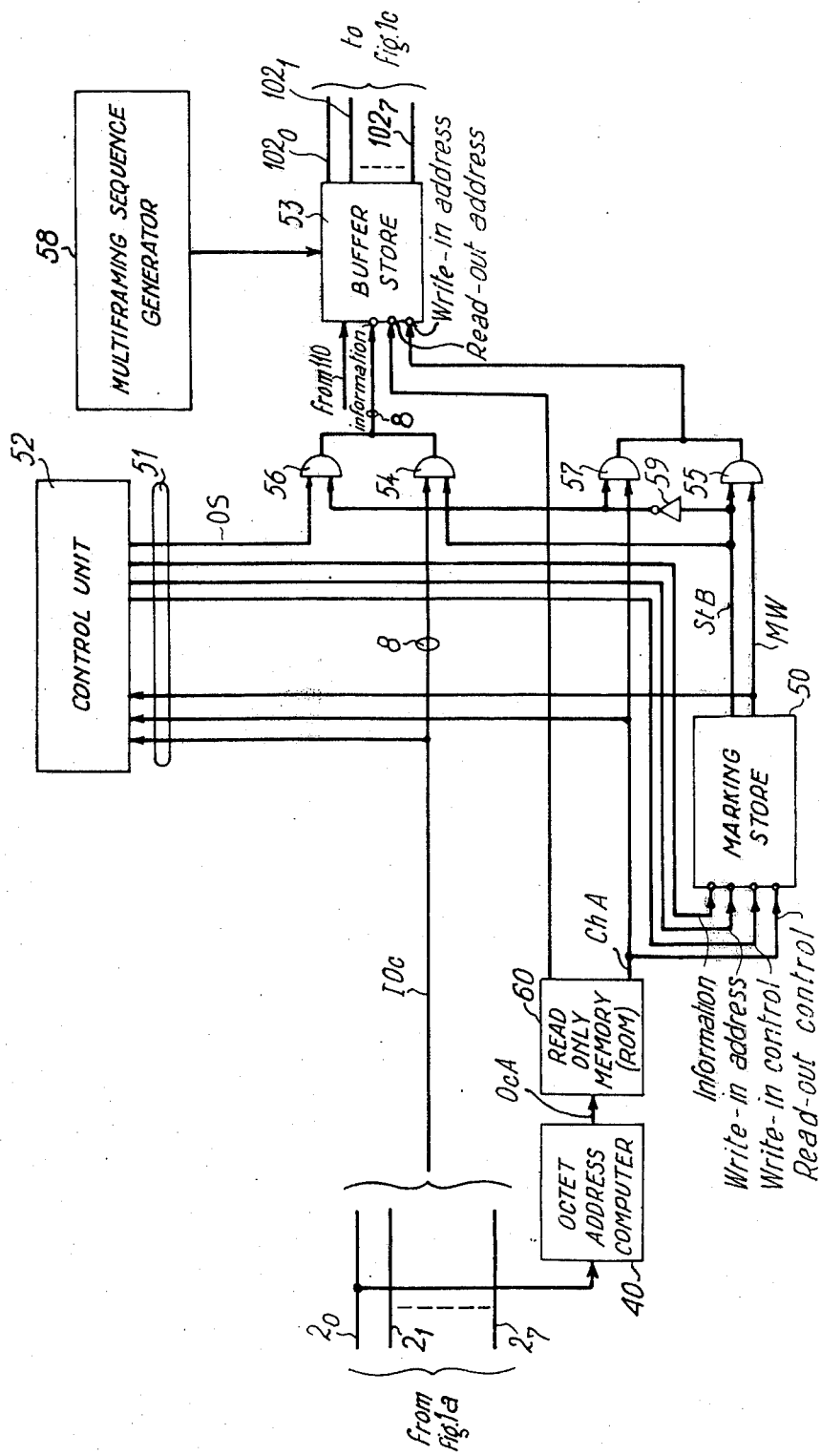

Multiplexer 11 is associated with an octet address computer 40 (FIG. 1b) connected to whichever of the multiplex 2.048 Mbit/s junctions transmits the first bits of the octets (assumed to be the multiplex junction $2_0$), computer 40 being connected to time base 110. An octet computer of this kind is described in the patent application previously mentioned. The octets and their first bits form 256 interlaced sequences. As already stated, each octet has a two-part address. The first part thereof is between 0 and 255 and is the rank of the octet in the frame of 256 0.5 $\mu$s time slots forming the parallel 2.048 Mbit/s multiplex. The first part of the address therefore contains 8 bits.

The second part of the address is the channel address in the 80-octet multiframe. In the case described in the earlier patent application previously mentioned of the monorate digital switching network, the number of bits in the second part of the address varies according as the second-order 64 kbit/s channel has been formed by the multiplexing of 5 or 20 or 80 first-order channels. In the first case of multiplexing of 5 channels, each channel appears with 16 recurrent octets in the multiframe, so the second part of the address is between 0 and 4 and has 3 bits. In the second case of multiplexing 20 channels, each channel appears with 4 recurrent octets in the multiframe; consequently, the second part of the address is between 0 and 19 and has 5 bits. In the third case of multiplexing of 80 channels, each channel appears with just a single octet in the multiframe and so the second part of the address is between 0 and 79 and contains 7 bits. Clearly, therefore, and as stated in the introduction, the address of the octet in the second-order channel (between 0 and 79) automatically gives the adress of the first-order channel, since for a given second-order digital channel $1_j$ ($0 \leq j \leq 255$) of address $j$ (first part of the octet address) it is known which first-order channels of high or intermediate or low rate are multiplexed in such second-order channel. Let $i$ denote the number of the octet between 0 and 79. In the case of a second-order channel in which high-rate first-order channels are multiplexed, the channel number is the remainder $q_x$ of the division $i/5$. In the case of a second-order channel in which intermediate-rate first-order channels are multiplexed, the channel number is the remainder $q_y$ of the division $i/20$. In the case of a second-order channel in which low-rate first-order channels are multiplexed, the channel number is the remainder $q_z$ of the division $i/80$ whereby the channel number is identical to the octet number $i$.

In the case of the multirate digital switching network according to the invention, the first-order channel address cannot be deduced automatically from the address of the octet in the multiframe of the second-order channel and, as stated in the opening part hereof, a table contained in a read-only store 60 must be available. Store 60 is addressed for reading-out by the address (first and second parts) of the octet and supplies the address of the first-order channel. Assuming that the first-order channel multiplexing schedule given in Table II of the opening part hereof corresponds to the second-order digital channel $1_{107}$, in which case the first part of the octet number is $$107 = 0\ 1\ 1\ 0\ 1\ 0\ 1\ 1$$

and the octet number 58 - i.e.:

$$58 = 0\ 1\ 1\ 1\ 0\ 1\ 0$$

it can be gathered from the multiplexing schedule that octet 58 of channel 107 belongs to the fifth of the 8 low-rate channels or, if the channels are numbered from 1 to 20, to the 17th channel.

The first-order channel address ChA supplied by read-only store 60 effects a read-out addressing of the marking store 50 of the data switching network. The latter store contains marking words (MW) which can be selectively directed to the control unit 52 or to the buffer store 53. The marking words comprise a status bit (StB) which is a one or a zero according to the actual state of the communication. In proportion as the communication establishment proceeds, the marking word goes from the marking store to the control unit, where it is modified and sent back to the marking store. It can be said that the processing of connection and disconnection progresses by modification of the marking word. Consequently, the status bit (StB) of the marking word indicates whether the data channel from which an octet is received is in the data-transmitting state or in the signalling state. Further, the marking word contains the address of the correspondent if the channel is being transmitting data, or call-processing bits if the channel is being transmitting signalling in view of connection.

The information octet (IOc), the channel address (ChA) and the marking word (MW) are then transmitted via the bus 51 to the control unit 52. If the phase is one of data transmission (StB = 1), the information octet IOc is written into buffer store 53 at the address read-out in the read-only store 60. To this end, the status bit (StB) of the marking word (MW) read-out in store 50 opens gates 54 which connect the multiplex junctions $2_1$—$2_7$ transmitting the last-mentioned octet to the information inputs of the buffer store 53, and gates 55 which connect store 50 to the write-in addressing inputs of store 53.

If the phase is one of signalling transmission (StB = 0), a signalling octet (SOc) supplied by control unit 52 is written into the buffer store at the address (ChA) of the incoming channel. To this end, through the agency of inverter 50 which converts the status bit (StB) which equal to zero into a one, the gates 56 are open by the inverted status bit and connect the control unit to the information inputs of store 53, and gates 57 are also open and connect store 60 to the write-in addressing inputs of store 53.

Summing-up, the octets IOc may be data octets or signalling octets. When the octets IOc are data octets, they are stored in buffer memory 53 through gates 54 at the address of the called party. The called party address is contained in the marking word and is applied to the write-in address inputs of buffer store 53 through gates 55. When the octets IOc are signalling octets, they are sent to control unit 52. This control unit generates signalling octets SOc which are stored in the buffer memory 53 through gates 56 at the address of the calling party. This is to inform the calling parts of the processing of the call (calling tone, ringing back tone, etc.). The calling party address is contained in the read-only memory store 60 and is applied to the write-in address inputs of buffer store 53 through gates 57.

In the case of a monorate multiplex digital switching network, read-out from the buffer store 53 was controlled directly by time base 110. In the present case, however, read-out from store 53 is controlled by time base 110 which gives the addresses of the outgoing octets through the read-only store 60 which gives the addresses of the corresponding first-order channels. The first bits of the octets written into the buffer store 53 are removed at write-in and are replaced at read-out by the bits F of a pseudorandom multiframing sequence produced by generator 58. Of course, the octets to carry the bits of the multiframing sequence are the octets of a single 2.048 Mbit/s multiplex channel, e.g. the channel $102_0$. However, since all the 256 64 kbit/s multiplex channels are phase-locked at the output there is no need to apply to the octets the bits of the multiframing sequences in shared time. The first bit of the pseudorandom sequence can be applied to the 256 outgoing second-order multiplex channels of the first frame, the second bit of the sequence can then be applied to the 256 outgoing second-order multiplex channels of the second frame, and so on up to the 80th bit of the sequence. In short, the 256 pseudorandom multiframing sequences of the octets of the frames of the 256 second-order multiplex channels are out of phase in the case of the incoming second-order multiplex channels and in phase in the case of the outgoing second-order multiplex channels.

The octets with their multiframing sequence bits and appearing in parallel at the 2.048 Mbit/s third-order multiplex junctions $102_0$ to $102_7$ are applied to a multiplex demultiplexer 11' which converts the 8 2.048 Mbit/s parallel multiplexed channels $102_0$ to $102_7$ into 256 serial 64 kbit/s multiplexed channels $101_0$ to $101_{255}$. The demultiplexer 11' shares the time base 110 with the multiplexer 11 and has a parallel-to-series converter 112' and a buffer store 111'.

Figure 1C:
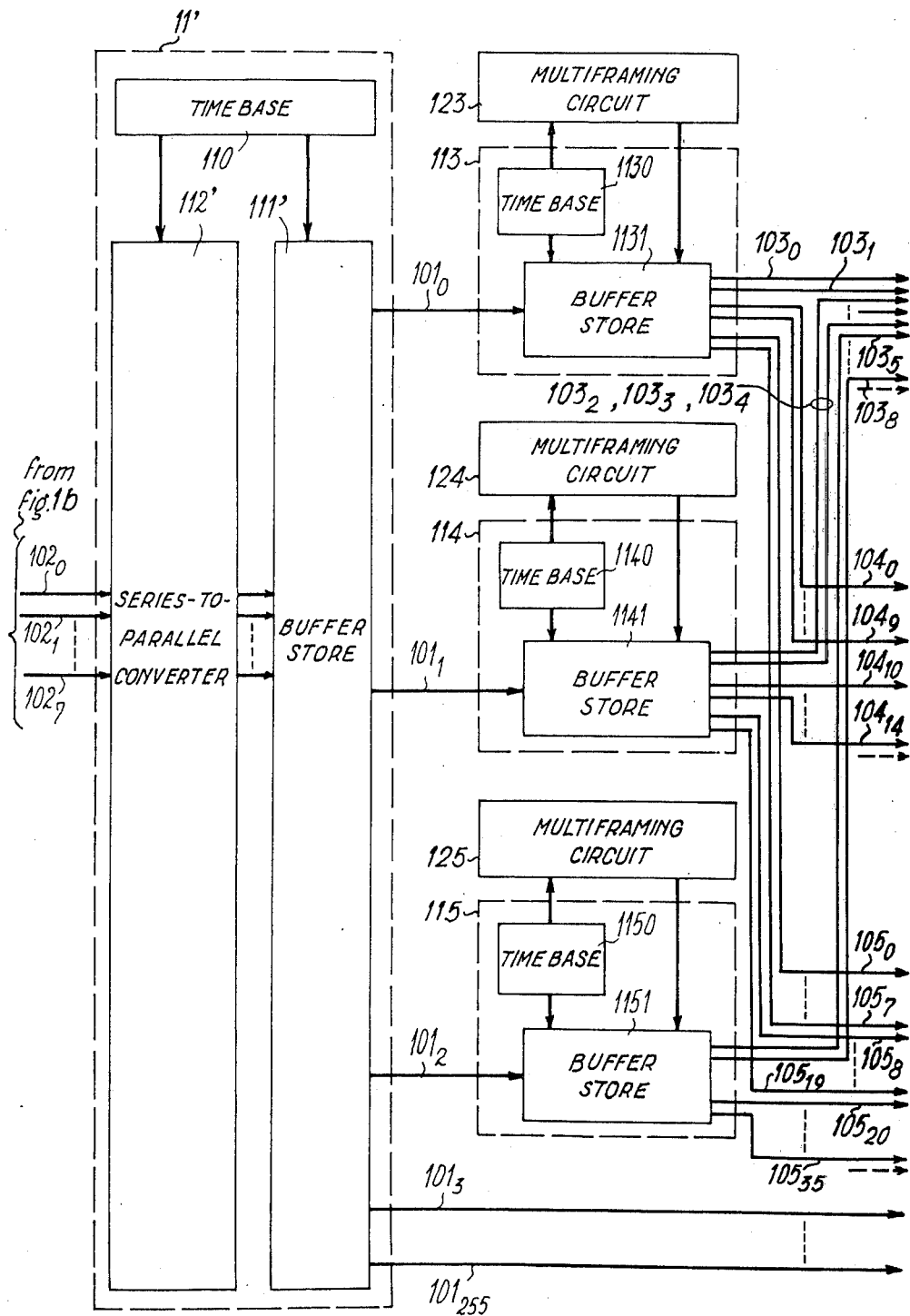

By symmetry with FIG. 1a, it has been assumed in FIG. 1c that the multiplex channel $101_0$ was demultiplexed into two 12.8 kbit/s channels $103_0$ and $103_1$, 10 3.2 kbit/s channels $104_0$ to $104_9$ and 8 0.8 kbit/s channels $105_0$ to $105_7$ in the demultiplexer 113, that the multiplex channel $101_1$ was demultiplexed into 3 12.8 kbit/s channels $103_2$, $103_3$ and $103_4$, 5 3.2 kbit/s channels $104_{10}$ to $104_{14}$ and 12 0.8 kbit/s channels $105_8$ to $105_{19}$ in the demultiplexer 114 and that the multiplex channel $101_2$ was demultiplexed into 4 12.8 kbit/s channels $103_5$ to $103_8$, no 3.2 kbit/s chennel and 16 0.8 kbit/s channels $105_{20}$ to $105_{35}$ in the demultiplexer 115.

Each of the demultiplexers 113, 114, 115 has a respective time base 1130, 1140, 1150 and a respective buffer store 1131, 1141, 1151. Associated with each demultiplexer 113, 114, 115 is a multiframe recovering circuit 123, 124, 125 respectively of the kind described in the earlier patent application mentioned herein. The output of the transcoder of the multiframe recovering circuit is used as a register for addressing the demultiplexer buffer store.

Figure 2:
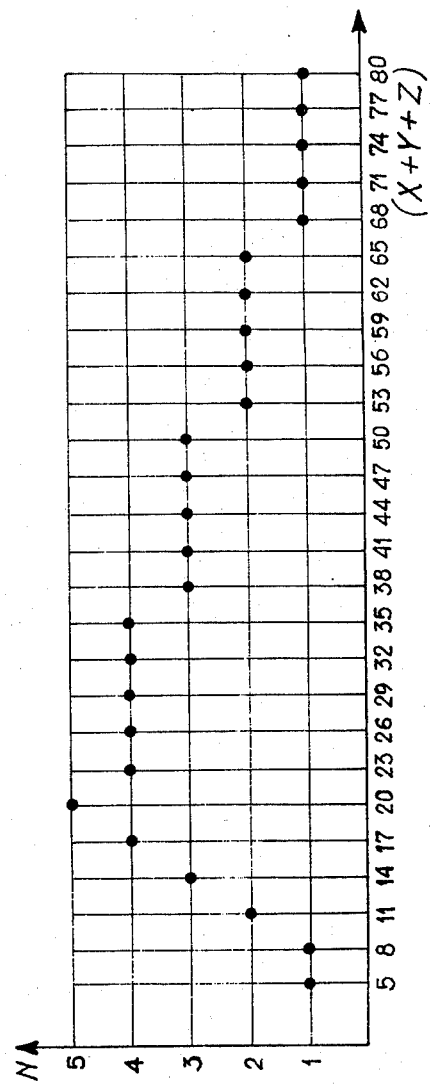
FIG. 2 is a diagram showing the relationship between the number ($x+y+z$) of the first order channels multiplexed in a second-order channel and the number N of combinations of different multiplexing schedules.

Referring again to FIG. 2, 80 can be written in quaternary notation as:

$$80 = t.4^3 + x.4^2 + y.4^1 + z.4^0$$

$$= 1.4^3 + 1.4^2 + 0.4^1 + 0.4^0$$

in which $t, x, y, z$ are quaternary digits having the value 0 or 1 or 2 or 3. If $x$, $y$ and $z$ can have values greater than 3, reducing $x$ by one unit is the same as increasing $y$ by 4 units or as increasing $z$ by 16 units, and decreasing $y$ by one unit is the same thing as increasing $z$ by 4 units.

The number of multiplexing schedules possible in a second-order channel is therefore given by the following Table III.

What we claim is:

1. A multirate time-division digital switching network comprising:
   first multiplexing means in which first-order digital data channels transmitting words consisting of a given number of bits and having first rates which are different from, but multiples of, one another are given a first multiplexing converting them into second-order digital data channels having a second predetermined rate, said second-order channels each containing first-order channels of at least two different rates in accordance with multiplexing schedules which can differ for each second-order multiplex channel;
   second multiplexing means in which said second-order digital channels are given a second multiplexing converting them into third-order digital data channels having a third predetermined rate;
   a digital switching unit having at least one buffer store in which the first-order channel words multiplexed into the third-order channels are grouped at a resultant address having first and second part, whose first part is the address of the second-order channel containing the first-order channel word in the third-order channel and whose second part is the address of the first-order channel in the second-order channel;
   means for inserting in each of the words of a second-order channel bits forming a pseudorandom sequence having a known period so that the bits of a given rank of the words of a third-order channel form a number of interleaved pseudorandom sequences
   means for separating said pseudorandom sequences and for deriving therefrom the addresses of the words in the second-order channels; and
   a read only store addressed by the addresses of the words in the second-order channels and supplying the first-order channel addresses associated with said word addresses in the second-order channels according to said multiplexing schedules.

2. A multirate time-division digital switching network according to claim 1 in which the words consisting of a given number of bits are octets and the bits of a given

TABLE III

| x | y | z | x | y | z | x | y | z | x | y | z | x | y | z | x | y | z | (x+y+z) | N | ϵN |
|---|---|---|---|---|---|---|---|---|---|---|---|---|---|---|---|---|---|---|---|---|
| 5 | 0 | 0 |   |   |   |   |   |   |   |   |   |   |   |   |   |   |   | 5 | 1 | 1 |
|   |   |   | 4 | 4 | 0 |   |   |   |   |   |   |   |   |   |   |   |   | 8 | 1 | 2 |
|   |   |   | 4 | 3 | 4 | 3 | 8 | 0 |   |   |   |   |   |   |   |   |   | 11 | 2 | 4 |
|   |   |   | 4 | 2 | 8 | 3 | 7 | 4 | 2 | 12 | 0 |   |   |   |   |   |   | 14 | 3 | 7 |
|   |   |   | 4 | 1 | 12 | 3 | 6 | 8 | 2 | 11 | 4 | 1 | 16 | 0 |   |   |   | 17 | 4 | 11 |
|   |   |   | 4 | 0 | 16 | 3 | 5 | 12 | 2 | 10 | 8 | 1 | 15 | 4 | 0 | 20 | 0 | 20 | 5 | 16 |
|   |   |   |   |   |   | 3 | 4 | 16 | 2 | 9 | 12 | 1 | 14 | 8 | 0 | 19 | 4 | 23 | 4 | 20 |
|   |   |   |   |   |   | 3 | 3 | 20 | 2 | 8 | 16 | 1 | 13 | 12 | 0 | 18 | 8 | 26 | 4 | 24 |
|   |   |   |   |   |   | 3 | 2 | 24 | 2 | 7 | 20 | 1 | 12 | 16 | 0 | 17 | 12 | 29 | 4 | 28 |
|   |   |   |   |   |   | 3 | 1 | 28 | 2 | 6 | 24 | 1 | 11 | 20 | 0 | 16 | 16 | 32 | 4 | 32 |
|   |   |   |   |   |   | 3 | 0 | 32 | 2 | 5 | 28 | 1 | 10 | 24 | 0 | 15 | 20 | 35 | 4 | 35 |
|   |   |   |   |   |   |   |   |   | 2 | 4 | 32 | 1 | 9 | 28 | 0 | 14 | 24 | 38 | 3 | 38 |
|   |   |   |   |   |   |   |   |   | 2 | 3 | 36 | 1 | 8 | 32 | 0 | 13 | 28 | 41 | 3 | 41 |
|   |   |   |   |   |   |   |   |   | 2 | 2 | 40 | 1 | 7 | 36 | 0 | 12 | 32 | 44 | 3 | 44 |
|   |   |   |   |   |   |   |   |   | 2 | 1 | 44 | 1 | 6 | 40 | 0 | 11 | 36 | 47 | 3 | 47 |
|   |   |   |   |   |   |   |   |   | 2 | 0 | 48 | 1 | 5 | 44 | 0 | 10 | 40 | 50 | 3 | 50 |
|   |   |   |   |   |   |   |   |   |   |   |   | 1 | 4 | 48 | 0 | 9 | 44 | 53 | 2 | 52 |
|   |   |   |   |   |   |   |   |   |   |   |   | 1 | 3 | 52 | 0 | 8 | 48 | 56 | 2 | 54 |
|   |   |   |   |   |   |   |   |   |   |   |   | 1 | 2 | 56 | 0 | 7 | 52 | 59 | 2 | 56 |
|   |   |   |   |   |   |   |   |   |   |   |   | 1 | 1 | 60 | 0 | 6 | 56 | 62 | 2 | 58 |
|   |   |   |   |   |   |   |   |   |   |   |   | 1 | 0 | 64 | 0 | 5 | 60 | 65 | 2 | 60 |
|   |   |   |   |   |   |   |   |   |   |   |   |   |   |   | 0 | 4 | 64 | 68 | 1 | 62 |
|   |   |   |   |   |   |   |   |   |   |   |   |   |   |   | 0 | 3 | 68 | 71 | 1 | 63 |
|   |   |   |   |   |   |   |   |   |   |   |   |   |   |   | 0 | 2 | 72 | 74 | 1 | 64 |
|   |   |   |   |   |   |   |   |   |   |   |   |   |   |   | 0 | 1 | 76 | 77 | 1 | 65 |
|   |   |   |   |   |   |   |   |   |   |   |   |   |   |   | 0 | 0 | 80 | 80 | 1 | 66 | rank forming a pseudorandom sequence are the first bits of the octets.

3. A multirate time-division digital switching network according to claim 1 in which the first rates which are different from, but multiples of, one another and which are given a first multiplexing are 12.8, 3.2, and 0.8 kbit/s.

4. A multirate time-division digital switching network according to claim 1 in which the second-order channels each contain $x_i$, $x_j$, $x_k$ first-order channel words at the respective rates $r_i$, $r_j$, $r_k$, the quantity, $\sum r_i x_i + r_j x_j + r_k x_k$ being equal to a predetermined multiframe number.

* * * * *